Jan. 13, 1925.

Re. 15,981

H. O. BOOTS

CARPET BEATER

Original Filed July 24, 1922

Witness
Pat Kusler

Inventor
Harry O. Boots
by Bair & Freeman Attorneys

Reissued Jan. 13, 1925. Re. 15,981

UNITED STATES PATENT OFFICE.

HARRY O. BOOTS, OF LINDEN, IOWA.

CARPET BEATER.

Original No. 1,498,344, dated June 17, 1924, Serial No. 577,225, filed July 24, 1922. Application for reissue filed December 1, 1924. Serial No. 753,388.

*To all whom it may concern:*

Be it known that I, HARRY O. BOOTS, a citizen of the United States, residing at Linden, in the county of Dallas and State of Iowa, have invented certain new and useful Improvements in Carpet Beaters; and I do hereby declare the following to be a full, clear, and exact description of the invention, such as will enable others skilled in the art to which it appertains to make and use the same.

This invention relates to improvements in carpet beaters and particularly to manually operated carpet beaters.

One object of the present invention is to provide a novel and simple device of this character by means of which the operator can attach the same to his foot and quickly and easily move the device from place to place on the carpets or rugs being beaten.

Another object is to provide a device of this character wherein the operator can stand in an upright position and beat the carpet or rug thus obviating the usual strain of the back incident to the stooping over while wielding the beater.

Other objects and advantages will be apparent from the following description when taken in connection with the accompanying drawing.

Referring particularly to the accompanying drawing 10 represents a wooden or other block on which the operator is to place his foot. Carried by the block is a strap which the operator secures over his foot to hold the block attached thereto so that the block can be lifted with the foot, the strap being shown at 11.

Figure 5:
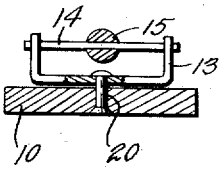
Figure 5 shows detail of beater fastening to the foot board.

The forward end of the block is rounded, as at 12, and carried by this portion of the block are the bearing members 13, which support a transverse shaft 14, and which pivots on bolt 20 as shown in Figure 5. Connected to this shaft and arranged to rock therewith, is a forwardly extending stem 15, on the outer end of which is mounted the wire frame 16 of the beater. Pivotally connected to the stem at a point intermediate the center and the point of the wire frame 16, is a vertical operating rod 17, said pivot being shown at 18. Said operating rod is fitted with a handle as shown at 21.

Figure 1:
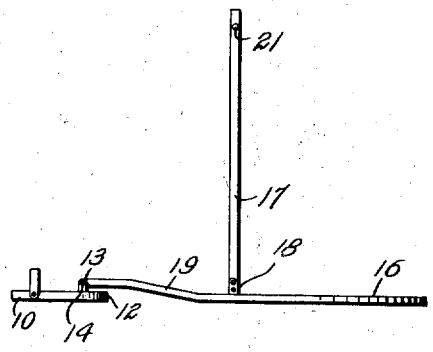
Figure 1 is a side elevation of a carpet beater made in accordance with my invention, the beater members being down.
Figure 1:
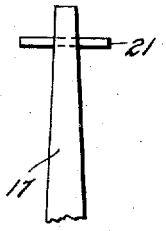
Figure 4:
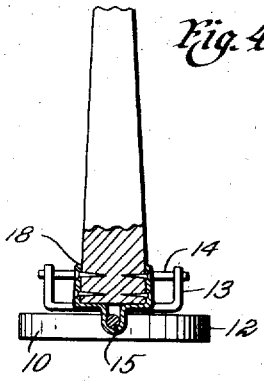
Figure 4 is a transverse sectional view taken on the line 4—4 of Figure 2.
Figure 2:
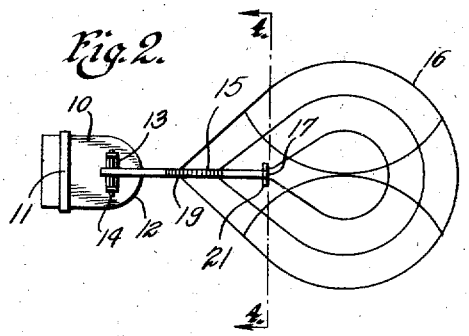
Figure 2 is a top plan view of the same.
Figure 3:
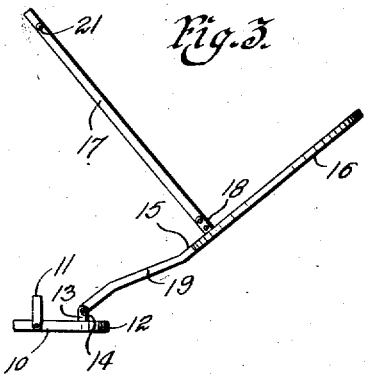
Figure 3 is a side elevation of the device showing the position of the parts when the beater member is raised.

The portion of the stem is offset downwardly so that the wire frame of the beater will engage with the carpet surface in the same plane as the block, this offset portion being shown at 19 in Figures 1 and 3 of the drawings.

It will thus be seen that when the operator places his foot on the block and properly attaches the same to the foot by the strap, and then places the block on the carpet or rug, it is only necessary to lift up on the rod 17 and then push down again with a sudden movement, thereby causing the wire frame to strike the carpet or rug and beat out the dust and dirt. Owing to the pivotal connection on the foot block, a considerable portion of the carpet or rug may be beaten without moving the foot. When necessary to move the operator simply moves or lifts his foot and steps with the block to another part of the carpet and repeats the up and down movement of the rod.

It will be readily understood that as the operator lifts his foot, when moving the beater from place to place on the carpet, the tendency will be to lift up on the operating rod, thereby lifting the beater frame from the carpet and greatly facilitating the said movement of the device.

Attention is called to the fact that the device is of extremely simple construction and is formed from a small number of parts. It will also be noted that the carpet can be effectively beaten without the usual strain on the back of the operator incident to stooping over. The ease and simplicity of operating this device makes it possible for the operator to clean the carpet more thoroughly and quickly than with a common hand beater.

What is claimed is:

A carpet beater including a foot block, a strap secured to said foot block for permitting the foot of an operator to be received therein and rest upon said foot block, a pair of upright spaced bearing members on said foot block arranged forwardly of said strap, a stem received between and pivotally connected to said bearing members, said stem being provided with an offset portion, a beater frame of substantially large area being carried by the free outer end of said stem and a hand operating rod extending upwardly from said stem and pivotally connected thereto for permitting the hand operating rod to be engaged for imparting a beating motion to said beater, said operating rod being connected to the stem forwardly of the offset portion thereof as and for the purposes stated.

Des Moines, Iowa, October 29, 1924.

HARRY O. BOOTS.